3,706,659
BRINE SALT CONCENTRATION REGULATION USING MICELLAR DISPERSIONS
John A. Davis, Jr., Littleton, Colo., assignor to Marathon Oil Company, Findlay, Ohio
Filed Nov. 27, 1970, Ser. No. 93,201
Int. Cl. B01d 12/00
U.S. Cl. 210—21                27 Claims

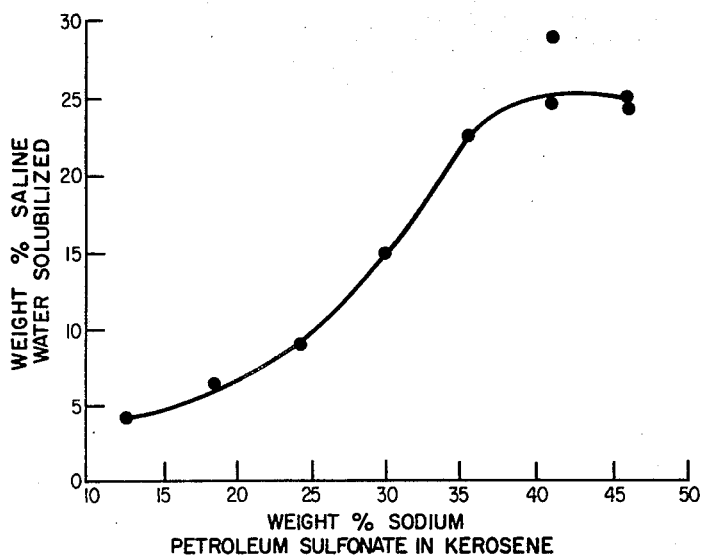
Fig. 1 SOLUBILIZATION OF SALINE WATER IN SODIUM PETROLEUM SULFONATE/KEROSENE SOLUTION @ 24°C
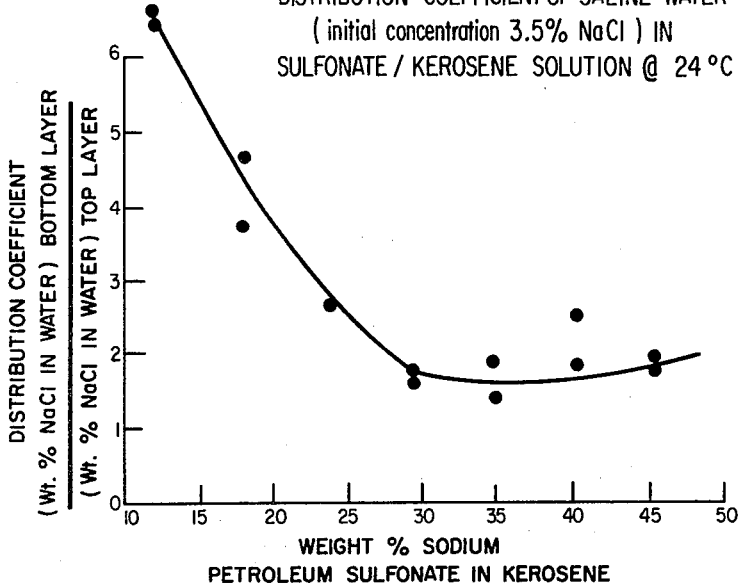
Fig. 2 DISTRIBUTION COEFFICIENT OF SALINE WATER (initial concentration 3.5% NaCl) IN SULFONATE/KEROSENE SOLUTION @ 24°C

ABSTRACT OF THE DISCLOSURE

The concentration of salts of various brines is modified to obtain an aqueous solution of desired salt concentration by contacting the brines with a micellar dispersion to form a microemulsion upper phase and an aqueous bottom phase. A less concentrated salt solution will be contained in the resulting microemulsion than will be in the aqueous bottom phase. In the event that the higher concentration solution is desired, the aqueous bottom phase is decanted and recovered. If the low concentration salt solution is desired, the microemulsion is subjected to a physical or chemical change to reduce its solubilizing capacity, e.g., by cooling, and the resulting bottom aqueous phase is recovered. In either case, the micellar dispersion or components thereof are recovered and recycled for additional brine treatment. Any surfactant or cosurfactant dissolved in the water can be removed, if necessary, and a series of process trains can be used to obtain water of desired salinity. The process can be used to obtain potable water from salt solutions.

BACKGROUND OF THE INVENTION

Field of the invention

Figure 3:
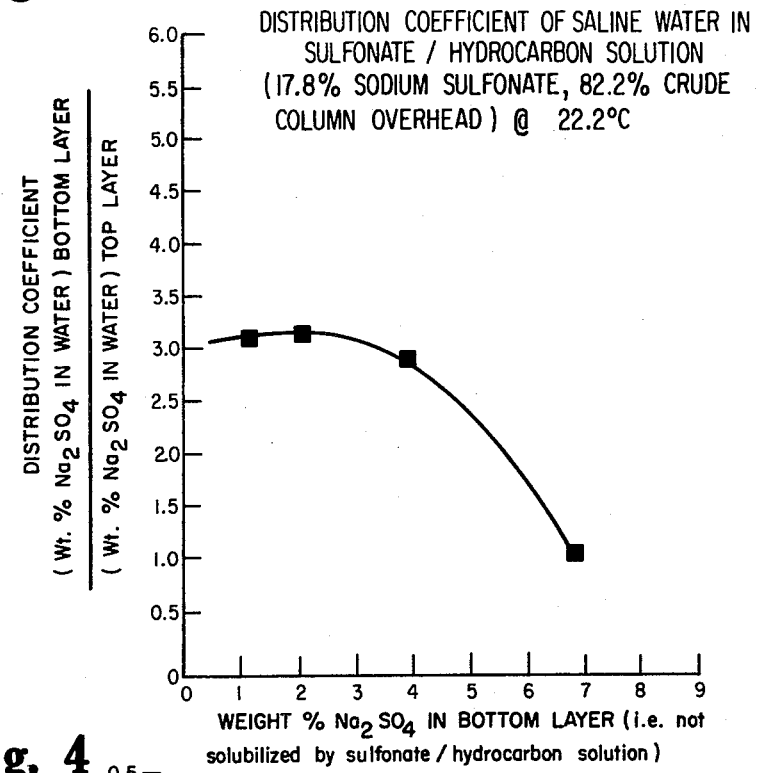

The invention relates to a process for obtaining water of a predetermined salt content from a mother liquor (brine) of greater salt concentration through solubilization of a portion of the mother liquor with a micellar dispersion to form a microemulsion containing an internal, solubilized water phase having a salt concentration lower than the mother liquor. Water of a desired higher salt concentration is then recovered from the unsolubilized bottom phase or; if water of a lower salt concentration is desired, the microemulsion is separated from the bottom phase and treated, for example, by cooling to cause the microemulsion to release at least a portion of the solubilized water phase.

Description of the prior art

U.S. 3,177,139 to Kimberlin, Jr. et al., teaches solvent extraction of water from saline water by counter-currently contacting the saline water with a solvent. The solvent is water containing an amine, e.g. triethylamine, etc. Such is typical of extracting fresh water from saline water with costly organic amines. The recovery of the amines has made these processes economically unattractive.

U.S. 3,318,805 to Hess et al., teaches extracting fresh water from saline water using an organic liquid at 500–600° F. and 1000–2000 p.s.i.g. to form a complex with the water. Water is thereafter recovered by subjecting the complex to increased pressures. The complex at the elevated pressure is immiscible with the residual saline water and is separated from the saline water by gravity.

U.S. 3,386,913 to Lazare teaches extracting water from saline water using a polymeric solvent having a molecular weight of 2,500–10,000. The solvent absorbs a fraction of the water to the exclusion of most of the salts—water is recovered by heating the solvent.

U.S. 3,454,489 to Li teaches a method of separating water from saline water by selective permeation of either the salt or the water through a liquid surfactant membrane. An emulsion is formed. The emulsion is washed with an aqueous solvent (e.g. water, alcohols and glycols) to obtain (1) a solution rich in salt, which remains within the membrane, and (2) the solvent containing the water. Thereafter, the water is separated from the solvent phase.

Two other patents teaching processes using the principal of the Li patent are U.S. 3,389,078 and 3,410,794.

GENERAL TEACHING OF THE INVENTION

The aqueous solutions of inorganic salts which can be concentrated or purified, depending on one's desires, through use of this invention include waters from mineral springs, chemical plant effluent streams, ocean waters, etc. Potable waters can be achieved through use of the process or highly concentrated salt solutions can be created which are useful in a number of published mineral extraction procedures.

The micellar dispersions used in this invention are made up of a relatively water insoluble, relatively non-polar fluid, such as a hydrocarbon, halogenated hydrocarbons, etc.; surfactants, and, optionally, consurfactants. They may even contain low salt concentration water. It is preferred that the non-polar fluids be hydrocarbons and that the fluid used be of as low a molecular weight as possible consistent with vapor pressures desired at the operating temperatures of the particular extraction. The low molecular weight insures that the solubilization and release of water occurs as rapidly as possible within the context of overall operating conditions. Suitable hydrocarbons include those having carbon numbers less than that of pentane to those hydrocarbons having carbon numbers greater than those of fuel oils.

Micellar dispersions have been commercial items for decades and many types of surfactants have been utilized to prepare these materials. They are used commercially for the preparation of "cutting oils," "soluble oils," "insecticide carriers," etc.

Books discussing micellar dispersions include "Clayton's The Theory of Emulsions and Their Technical Treatment" by C. G. Sumner (5th Ed., Chemical Publishing Co., New York 1954) and "Solubilization and Related Phenomena" by McBain and Hutchinson (Academic Press, New York 1955).

A wide variety of surfactant types are included within the classes of surfactants useful in the process. The surfactant classes include the cationic surfactants, non-ionic surfactants, amphoteric surfactants, and miscellaneous surfactants such as polymeric surfactants and fluorocarbon surfactants.

Obviously, the surfactant used in making up the micellar dispersion should not be precipitated, deactivated or destroyed by ions in the water from which salts are being extracted. Thus, one would not use an oleate or stearate soap to make the micellar dispersion if calcium, magnesium or iron salts were to be removed from solution.

Where a cosurfactant is incorporated into the micellar dispersion, it is preferred that the cosurfactant have limited water solubility, i.e. less than about 10% and preferably less than 3% at ambient temperature. Examples of cosurfactant include alcohols, aldehydes, ketones, ethers, amines, and like organic compounds containing 1 to about 20 or more carbon atoms and more preferably about 4 to about 16 carbon atoms.

The major requirement for the particular surfactants and cosurfactants used to formulate a micellar dispersion is that the resulting micellar dispersion have a distribution coefficient, based on the concentration of salt in the unsolubilized phase divided by the concentration of salt in the solubilized phase which is at least about 1.05, preferably 1.25 and more preferably greater than about 1.5.

Preferably, the surfactants, and any cosurfactants, are relatively water insoluble. The use of surfactants having relatively high water solvency can lead to the necessity for the recovery of surfactant from the low salt content water phase. This, however, is not always a handicap because in some instances, it may even be desirable to leave the surfactant in the effluent stream. For example, liquid fertilizer can be prepared by using a relatively water soluble, biodegradable phosphorous-containing surfactant to reduce the ammonium sulfate concentration of factory effluent streams and applying the low concentration brine to the plants by irrigation. Additionally, quaternary surfactants or cosurfactants could be used where the fertilizer requires a bactericide.

Surfactant and cosurfactant can be removed between each stage of a multi-stage purification by precipitating the surfactant with a precipitating agent, adsorbing the surfactant on an ionic exchange resin, adding metal ions to remove the surfactant by a flotation process, etc. If necessary, the surfactant (and/or cosurfactant) can be recycled to form additional micellar dispersion. For example, this is readily done by adsorbing surfactant on activated char and then desorbing it with steam for further use.

In a multi-stage salt removal operation, the initial stages should utilize relatively water soluble surfactants and cosurfactants in order that relatively large amounts of low salt content water will be extracted from a given volume of feed. In each successive stage, the water solubility of surfactant and any cosurfactant should be reduced to relatively increase the amount of salt removed from the feed solution. The reduced volume at each stage can be handled by the more hydrophobic micellar dispersions although they tend to solubilize less and less feed as they become less and less hydrophilic in character.

Once the microemulsion is formed, a maximum practical amount of water has been solubilized, and the lower water phase is removed, the microemulsion must be induced to give up all or a portion of its internal phase water.

This is done by subjecting the microemulsion to a physical or chemical change or a combination of the two sufficient to obtain at least two distinct phases. Examples of physical changes include centrifugation, electrical techniques (e.g. electrostatic coagulation of the dispersed water and then separation), decrease in temperature, etc. Chemical changes include pH change, adding de-emulsifiers, etc. Preferably, the microemulsion is cooled to a temperature sufficiently low so that two distinct phases are formed. The top phase is essentially a micellar dispersion or a mixture of microemulsion and/or micellar dispersion. The bottom phase is water of reduced salinity.

Either recovered brine concentrate or reduced salinity water can again be contacted with a micellar dispersion and the above procedure repeated as often as is needed to obtain a desired salt concentration.

THE DRAWINGS

The best surfactant or cosurfactant(s) of a group of surfactants can be selected for a particular usage by using routine laboratory procedures to obtain curves of the type shown in FIGS. 1 through 5.

FIG. 1 graphically demonstrates the amount of saline water having an initial concentration of 3.5% NaCl which is solubilized by an indicated mixture of a designated volume of a commercial sodium petroleum sulfonate (based on 62% active sulfonate) having an average equivalent weight of 440–470 at 24° C.

FIG. 2 graphically displays the distribution coefficients of the saline water for different amounts of petroleum sulfonate in kerosene. The "top layer" on the abscissa is water "solubilized" in the sulfonate/kerosene micellar dispersion and the bottom layer is the concentrated salt in water phase.

FIG. 3 graphically illustrates the distribution coefficient of equal volumes of water containing described amounts of sodium sulfate and a sulfonate-hydrocarbon mixture at 22.2° C. Before contact with the water, the micellar dispersion contained 17.8% sodium petroleum sulfonate having an average equivalent weight of 460–470, 62% active sulfonate, 81.7% crude column overhead and 0.5% isopropanol.

Figure 4:
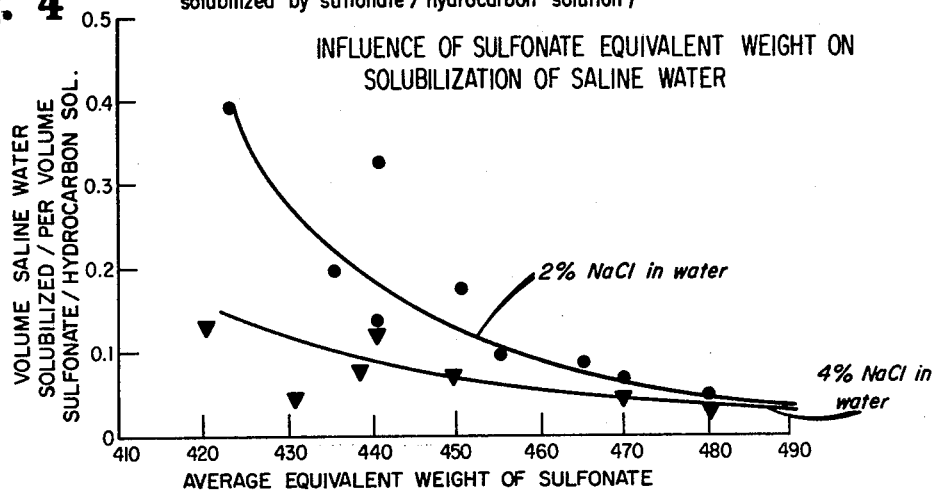

FIG. 4 illustrates the amount of saline water solubilized in a sulfonate/hydrocarbon solution containing different average equivalent weight sulfonates. The initial saline water to sulfonate/hydrocarbon volume ratio is 6:4, respectively. The micellar dispersion contains 16% sodium petroleum, about 62% active sulfonate. One curve represents 2.0% NaCl saline water and the other 4% NaCl in water.

Figure 5:
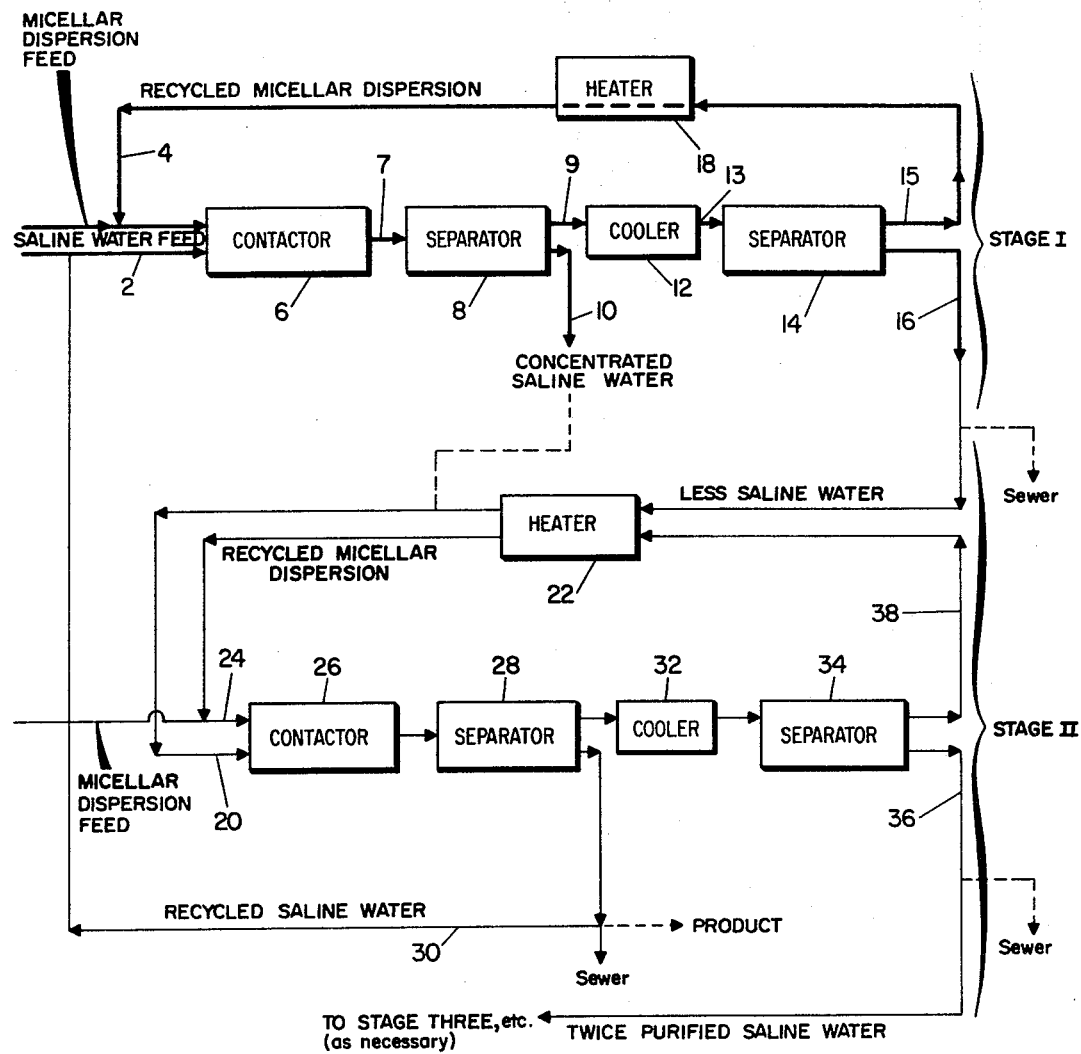

The above data are utilized to design a process which operates in accordance with the process flow outlined in FIG. 5 depicting both a single and a multi-stage desalinization process.

FIG. 5 illustrates a typical process flow for single and multi-stage salt processes wherein the lower salt concentration water from stage I is the feed for stage II etc., where the low or high salt concentration water from stage II is recycled to the feed of stage I and where the "twice purified water" or brine from stage II can be further processed by additional stages until water of desired ionic content is obtained.

The heavy lined stage I illustrates a typical process flow diagram for a single stage. Stage I in combination with the fine line shows how multi-trains can provide a multi-stage process. Of course, three or more stages can be used. Salt water feed introduced through line 2 is mixed with micellar dispersion introduced through feed line 4 in contactor 6 and the resulting mixture is passed to separator 8 where a high concentration brine settles out and is removed through line 10. An upper, microemulsion phase, containing a lower salt concentration brine, is passed through cooler 12 and passed into separator 14 where a low salt content water forms a bottom phase recovered through outlet 16 or which can comprise the feed 20 for salt removal stage II. The upper phase micellar dispersion-microemulsion from separator 14 is circulated through heater 18 and recycled to form part of micellar dispersion feed 4. In stage II and subsequent stages, the cycle is repeated as often as is needed to remove desired amounts of salts from water solution.

In stage II, feed 20 is passed through heater 22 and into contactor 26. The effluent of contactor 26 is introduced into separator 28 and forms an upper microemulsion phase and a lower water phase having a relatively high salt content. The water phase can be recycled through line 30 to make up saline water feed 2 in stage I or it can be sewered. The upper phase from separator 28 is passed through cooler 32 and into separator 34 where two phases again form and a lower water phase having a relatively low salt concentration is removed through conduit 36 and can be passed through another stage of purification or can be used as is. The upper phase from separator 34 is passed to heater 22 through conduit 38 and finally becomes a part of micellar dispersion feed 24. Optionally, micellar dispersion feed, in addition to stream 38, can be added to feed 24. Stream 30 can optionally be recycled to stream 2.

In a salt concentration procedure, depicted by dashed lines, the high concentration effluent in line 10 is then fed to stage II, i.e. line 16 is sewered, and line 10 (now line 20) is fed into contactor 26 as feed 20. The extracted water 30 is now the product and line 36 is sewered.

The cycle of stage II can be repeated as often as is needed to remove desired amounts of salts from particular brines.

The data of FIGS. 1-4 are necessary for carrying out a process such as outlined in FIG. 5. With these data in hand, the engineer will balance distribution coefficients against solubilization quantities, etc. and will design a process which is the most efficient for his particular needs, having in mind available surfactants, cosurfactants, etc. and the overall economics of the operation. While the above general teachings are applicable to all micellar dispersions, the specifics of particular systems vary with the character of the surfactant, hydrocarbon, etc. Therefore, the invention will be more particularly described with respect to one type of surfactant, that is, applicant's preferred petroleum sulfonate surfactant.

DESCRIPTION OF PREFERRED EMBODIMENTS OF INVENTION

The monovalent cation sulfonate should have an average equivalent weight within the range of about 300 to about 600 and more preferably about 350 to about 550. Even more preferred are the sodium and ammonium petroleum sulfonates having average equivalent weights of about 390 to 510.

The anionic surfactants are preferred and of the anionic surfactants, the substantially water insoluble monovalent cation petroleum sulfonates are the most preferred.

The equivalent weight of a sulfonate is a measure of its water insolubility and of the distribution coefficient of a micellar solution made from such sulfonates. Higher equivalent weight sulfonates are more water insoluble than are lower equivalent weight sulfonates and produce micellar dispersions having higher distribution coefficients and reduced solubilizing power.

The amount of water solubilized by a given micellar dispersion is a function of the salinity of the water and decreases with increasing salinity.

EXAMPLE 1

Referring to FIG. 5 of the drawings, micellar dispersions 4 having concentrations identified in Columns 4 and 15 of Tables I, II, and III contact saline water feed 2. The concentrations of the components within the different streams of FIG. 5 are illustrated in Tables I–III, i.e., the column numbers identify with the numbered process streams.

Table I illustrates a process wherein the micellar dispersion 4 contacts saline water 2 at 60° C., the resulting mixture 7 is separated into bottom phase 10 and microemulsion 9 and is thereafter cooled to 24° C. The distribution coefficient of the micellar dispersion is 2.7 and the ratio recycle of micellar dispersion to product is 40. The weight percent of sodium petroleum sulfonate (average equivalent weight of 440–470, 62% active sulfonate, Sonneborn Petronate HL, trademark of Witco Chemical Co., Inc.) is 23.9 wt. percent, based on the kerosene within the micellar dispersion.

Table II illustrates an extraction process wherein the same sulfonate and hydrocarbon is used but the weight percent of the sulfonate to the kerosene is 45.5 wt. percent and the ratio of recycled micellar dispersion to product is 11.4. Also, the distribution coefficient are 1.9 in separators 8 and 14 and the operating temperature range is the same.

Table III illustrates a process wherein the weight percent of sulfonate to kerosene is 23.9%, distribution coefficient is 2.7, the micellar dispersion contacts the saline water at 80° C. and the solubilized saline water in the micellar dispersion is cooled to 24° C. The recycle ratio of micellar dispersion to product is 19.2.

TABLE I

|  | 2 | 4 | 7 | 9 | 10 | 13 | 15 | 16 |
|---|---|---|---|---|---|---|---|---|
| Surfactant-hydrocarbon, pounds/minute | 0 | 4,000 | 4,000 | 4,000 | 0 | 4,000 | 4,000 | 0 |
| Water, pounds/minute | 3,780 | 440 | 4,220 | 540 | 3,686 | 540 | 440 | 100 |
| Sodium chloride, pounds/minute | 137 | 4.44 | 141 | 7.20 | 134 | 7.20 | 4.44 | 2.76 |
| Weight percent sodium chloride | 3.50 |  |  |  | 3.52 |  |  | 2.69 |
| Temperature, °C | 60 | 60 | 60 | 60 | 60 | 24 | 24 | 24 |

NOTE.—Type of surfactant: Sonneborn Petronate HL; Type of hydrocarbon: Kerosene; Weight percent surfactant in hydrocarbon: 23.9; Distribution coefficients: Separator 8=2.7, Separator 14=2.7.

TABLE II

|  | 2 | 4 | 7 | 9 | 10 | 13 | 15 | 16 |
|---|---|---|---|---|---|---|---|---|
| Surfactant-hydrocarbon, pounds/minute | 0 | 1,136 | 1,136 | 1,136 | 0 | 0 | 1,136 | 0 |
| Water, pounds/minute | 868 | 386 | 1,255 | 486 | 76.8 | 76.8 | 486 | 100 |
| Sodium chloride, pounds/minute | 35.1 | 6.62 | 38.1 | 9.73 | 24.8 | 9.73 | 6.62 | 3.10 |
| Weight percent sodium chloride | 3.50 |  |  |  | 3.56 |  |  | 3.01 |
| Temperature, °C | 60 | 60 | 60 | 60 | 60 | 24 | 24 | 24 |

NOTE.—Type of surfactant: Sonneborn Petronate HL; Type of hydrocarbon: Kerosene; Weight percent surfactant in hydrocarbon: 45.5; Distribution coefficients: Separator 8=1.9, Separator 14=1.9.

TABLE III

|  | 2 | 4 | 7 | 9 | 10 | 13 | 15 | 16 |
|---|---|---|---|---|---|---|---|---|
| Surfactant-hydrocarbon, pounds/minute | 0 | 1,923 | 1,923 | 1,923 | 0 | 0 | 1,923 | 0 |
| Water, pounds/minute | 1,869 | 212 | 2,081 | 312 | 1,769 | 312 | 212 | 100 |
| Sodium chloride, pounds/minute | 67.7 | 1.82 | 69.4 | 4.15 | 65.4 | 4.15 | 1.82 | 2.35 |
| Weight percent sodium chloride | 3.50 |  |  |  | 3.56 |  |  | 2.29 |
| Temperature, °C | 80 | 80 | 80 | 80 | 80 | 24 | 24 | 24 |

NOTE.—Type of surfactant: Sonneborn Petronate HL; Type of hydrocarbon: Kerosene; Weight percent surfactant in hydrocarbon: 23.9; Distribution coefficients: Separator 8=2.7, Separator 14=2.7.

It is not intended that the invention be limited by the specifics taught herein. Rather, all equivalents obvious to those skilled in the art are intended to be incorporated within the scope of the invention as defined in the specification and appended claims.

What is claimed is:

1. A process for obtaining a water of predetermined salt concentration from a brine comprising:
   (1) solubilizing at least a portion of the brine with a micellar dispersion containing a surfactant having a distribution coefficient greater than about 1.05 to form a microemulsion top phase and a bottom phase, the bottom phase having a larger concentration of salt than the original brine,
   (2) separating the top phase from the bottom phase,
   (3) effecting a physical or chemical change on the microemulsion top phase sufficient to obtain at least two distinct phases, and
   (4) separating the bottom phase of (3) as the water containing the predetermined salt concentration.

2. The process of claim 1 wherein the temperature of the (3) top phase is reduced to form the two phases.

3. The process of claim 1 wherein the micellar dispersion is comprised of hydrocarbon and at least about 4% by volume of surfactant.

4. The process of claim 3 wherein the surfactant is a petroleum sulfonate having an average equivalent weight within the range of about 350 to about 600.

5. The process of claim 1 wherein the micellar dispersion is comprised of about 1 to about 70% hydrocarbon, about 20 to about 95% aqueous medium, and at least about 4% surfactant, the percents based on volume.

6. The process of claim 5 wherein the micellar dispersion contains about 0.01 to about 20% by volume cosurfactant.

7. The process of claim 6 wherein the cosurfactant is an alcohol, aldehyde, ketone, amine or ether containing 1 to about 20 carbon atoms.

8. The process of claim 7 wherein the cosurfactant is an alcohol having less than about 10% water solubility at ambient temperature.

9. The process of claim 1 wherein the distribution coefficient of the surfactant is greater than about 1.25.

10. A process for separating less saline water from brine comprising:
(1) contacting the brine with a micellar dispersion containing hydrocarbon and at least 4% surfactant, permitting the micellar dispersion to solubilize at least a portion of the brine to form a microemulsion top phase and a bottom phase, the bottom phase having a larger concentration of salt than the original brine,
(2) separating the top phase from the bottom phase,
(3) effecting a physical or chemical change on the top phase sufficient to obtain at least two distinct phases, and
(4) separating the bottom phase of (3) as the less saline water.

11. The process of claim 10 wherein the surfactant is a petroleum sulfonate having an average equivalent weight of about 300 to about 600.

12. The process of claim 10 wherein the surfactant concentration within the surfactant and hydrocarbon solution is at least 10% by volume.

13. The process of claim 10 wherein the top phase is subjected to a temperature reduction sufficient to form at least two distinct phases.

14. The process of claim 10 wherein the surfactant has a distribution coefficient of at least about 1.25.

15. A process for separating less saline water from brine comprising:
(1) contacting the brine with a solution comprised of surfactant and hydrocarbon, permitting the solution to solubilize at least a portion of the brine to form a microemulsion top phase and a bottom phase, the bottom phase having a larger concentration of salts than the original brine,
(2) separating the microemulsion top phase from the bottom phase,
(3) effecting a chemical or physical change on the microemulsion top phase sufficient to form at least two distinct phases,
(4) separating the bottom phase of (3) as the less saline water,
(5) contacting the less saline water of (4) with a micellar dispersion comprised of surfactant and hydrocarbon and permitting the micellar dispersion to solubilize at least a portion of the less saline water to form a microemulsion top phase and a saline water bottom phase, the saline water bottom phase having a larger concentration of salts than the original less saline water of (4),
(6) separating the top phase from the bottom phase in (5),
(7) effecting a chemical or physical change on the microemulsion top phase of (6) sufficient to form at least two distinct phases, and
(8) separating the bottom phase of (7) as the less saline water.

16. The process of claim 15 wherein the surfactant is a petroleum sulfonate containing a monovalent cation and having an average equivalent weight within the range of about 350 to about 550.

17. The process of claim 15 wherein the two distinct phases formed in (3) and (7) are obtained by decreasing the temperature of the microemulsion top phase.

18. The process of claim 15 wherein the surfactant and hydrocarbon solution of (1) contains at least 10% by volume surfactant.

19. The process of claim 15 wherein the surfactant and hydrocarbon solution of (1) contains water.

20. The process of claim 15 wherein the solution is a micellar dispersion and contains about 1 to about 70% hydrocarbon, about 20 to about 95% aqueous medium, and at least about 4% surfactant, the percents based on volume.

21. The process of claim 20 wherein the micellar dispersion contains about 0.01 to about 20% by volume of cosurfactant.

22. The process of claim 20 wherein the cosurfactant is an alcohol, aldehyde, ketone, ether, amine, or mixture of two or more of these compounds and has a water solubility of less than about 10% at ambient temperature.

23. The process of claim 15 wherein steps (5) through (8) are repeated at least twice.

24. The process of claim 15 wherein the surfactant and hydrocarbon solution of (1) is at a temperature above about 50° C.

25. The process of claim 15 wherein the temperature of the micellar dispersion of (5) is at a temperature above about 50° C.

26. The process of claim 15 wherein the surfactant to hydrocarbon ratio of (1) is greater than that in (5).

27. The process of claim 15 wherein the surfactant is a petroleum sulfonate having an average equivalent weight of about 350 to about 550 and wherein the surfactant of (1) is a petroleum sulfonate having an average equivalent weight lower than that of the surfactant of (5).

References Cited
UNITED STATES PATENTS

| | | | |
|---|---|---|---|
| 3,219,422 | 11/1965 | Ellis | 210—21 X |
| 3,454,489 | 7/1969 | Li | 210—22 |

FRANK A. SPEAR, Jr., Primary Examiner

U.S. Cl. X.R.

210—22